United States Patent [19]
Hsiung et al.

[11] Patent Number: 5,863,852
[45] Date of Patent: Jan. 26, 1999

[54] REGENERATION OF ADSORBENT BEDS

[75] Inventors: Thomas Hsiao-Ling Hsiung, Emmaus; John Bruce Wallace, Jr., Red Hill, both of Pa.

[73] Assignee: Air Products and Chemicals, Inc., Allentown, Pa.

[21] Appl. No.: 728,118

[22] Filed: Oct. 10, 1996

[51] Int. Cl.[6] .............................. B01J 20/34; B01J 38/02; B01J 38/04
[52] U.S. Cl. ................................................. 502/56; 502/34
[58] Field of Search ................................ 502/53, 56, 34

[56] References Cited

U.S. PATENT DOCUMENTS 4,713,224 12/1987 Tamhankar et al. ..................... 423/219
4,869,883 9/1989 Thorogood et al. ..................... 423/219

*Primary Examiner*—Michael L. Lewis
*Assistant Examiner*—Alexander G. Ghyka
*Attorney, Agent, or Firm*—Geoffrey L. Chase

[57] ABSTRACT

A method for regenerating a nickel-based catalytic adsorbent without using hydrogen in each cycle. Depending upon the configuration of the adsorbent bed, one or more interim regenerations, comprising the steps of heating the bed, flowing ultra-high purity nitrogen without hydrogen through the bed to remove adsorbed species, followed by cooling the bed, can be used to prepare the adsorbent bed for removal of unwanted species contained in cyrogenically produced nitrogen in order to make UHP nitrogen.

10 Claims, 2 Drawing Sheets

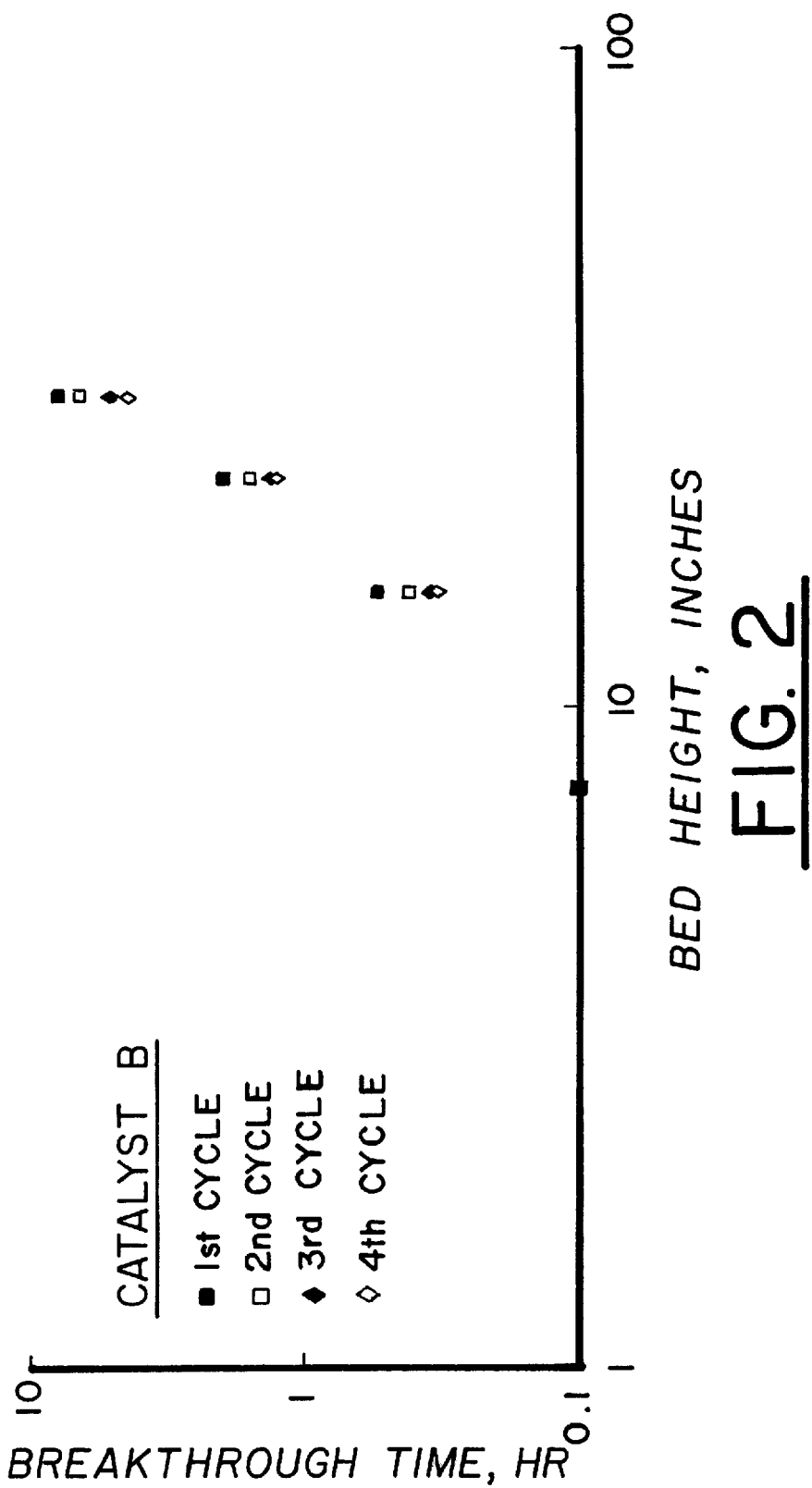

5,863,852

REGENERATION OF ADSORBENT BEDS

FIELD OF THE INVENTION

The present invention pertains to regenerating catalyst adsorbent beds used to remove trace impurities from cryogenically produced nitrogen.

BACKGROUND OF THE INVENTION

The manufacture of semiconductor devices, and in particular advanced semiconductor devices with very small feature sizes, higher device density and larger chip sizes requires the use of ultra-high purity (UHP) nitrogen gas as an inerting medium during various semiconductor processing steps. It is not uncommon for large semiconductor fabrication houses (FABS) to require in excess of 100,000 standard cubic feet per hour (SCFH) of UHP nitrogen. The UHP nitrogen is produced by separating the nitrogen from atmospheric air using well-known cryogenic technologies. The cryogenically separated nitrogen is then further treated to remove trace quantities of hydrogen, carbon monoxide, oxygen, carbon dioxide and water.

A number of techniques for removing these unwanted species (hydrogen, carbon monoxide, oxygen, carbon dioxide and water) from nitrogen are known. Several techniques are discussed in the specification of U.S. Pat. No. 4,869,883 which is incorporated herein by reference.

One particularly effective method for removing the unwanted species is by passing the nitrogen gas through a bed of a nickel-based catalytic adsorbent. The known adsorbents are capable of removing parts-per-million (ppm) levels of oxygen, carbon monoxide, hydrogen, carbon dioxide and water from cryogenically produced nitrogen to below parts-per-billion (ppb) levels. The capability of the adsorbent decreases with time-on-stream or time-in-use. In order to rejuvenate the ability of the nickel-based catalytic adsorbent to remove the unwanted species, the adsorbent must be regenerated periodically. It is known to use hydrogen diluted with nitrogen to reactivate the adsorbent each time the capacity of the adsorbent to remove the unwanted species has reached the end of its cycle time. After the hydrogen reduction step, wherein the adsorbed unwanted species are removed from the catalytic adsorbent, a purge step is necessary to remove the residual hydrogen from the adsorbent bed. The use of a cycle of hydrogen reduction followed by a purging cycle creates an inefficiency in the production of UHP nitrogen because of the time required to purge the bed of hydrogen. In addition, the costs of operating such a regeneration scheme on a continuing basis are significant.

SUMMARY OF THE INVENTION

The present invention pertains to regeneration of nickel-based catalytic adsorbent beds using a process wherein, depending upon the geometry of the adsorbent bed, at least one periodic regeneration of the adsorbent by the well-known hydrogen reduction technique can be replaced with a process wherein the adsorbent bed is heated to a temperature of at least about 300° F. (149° C.) followed by flowing nitrogen having a purity of at least 99.9999% $N_2$ through said bed while maintaining said bed at a temperature of at least about 300° F. (149° C.) for a period of time to remove a major portion of the adsorbed species from said adsorbent bed followed by cooling said adsorbent bed to a temperature no higher than 120° F. (49° C.).

BRIEF DESCRIPTION OF THE DRAWING

FIG. 2 is a plot of breakthrough time in hours against bed height when using the process of the present invention to regenerate another commercial nickel-based catalyst.

DETAILED DESCRIPTION OF THE INVENTION

Figure 1:
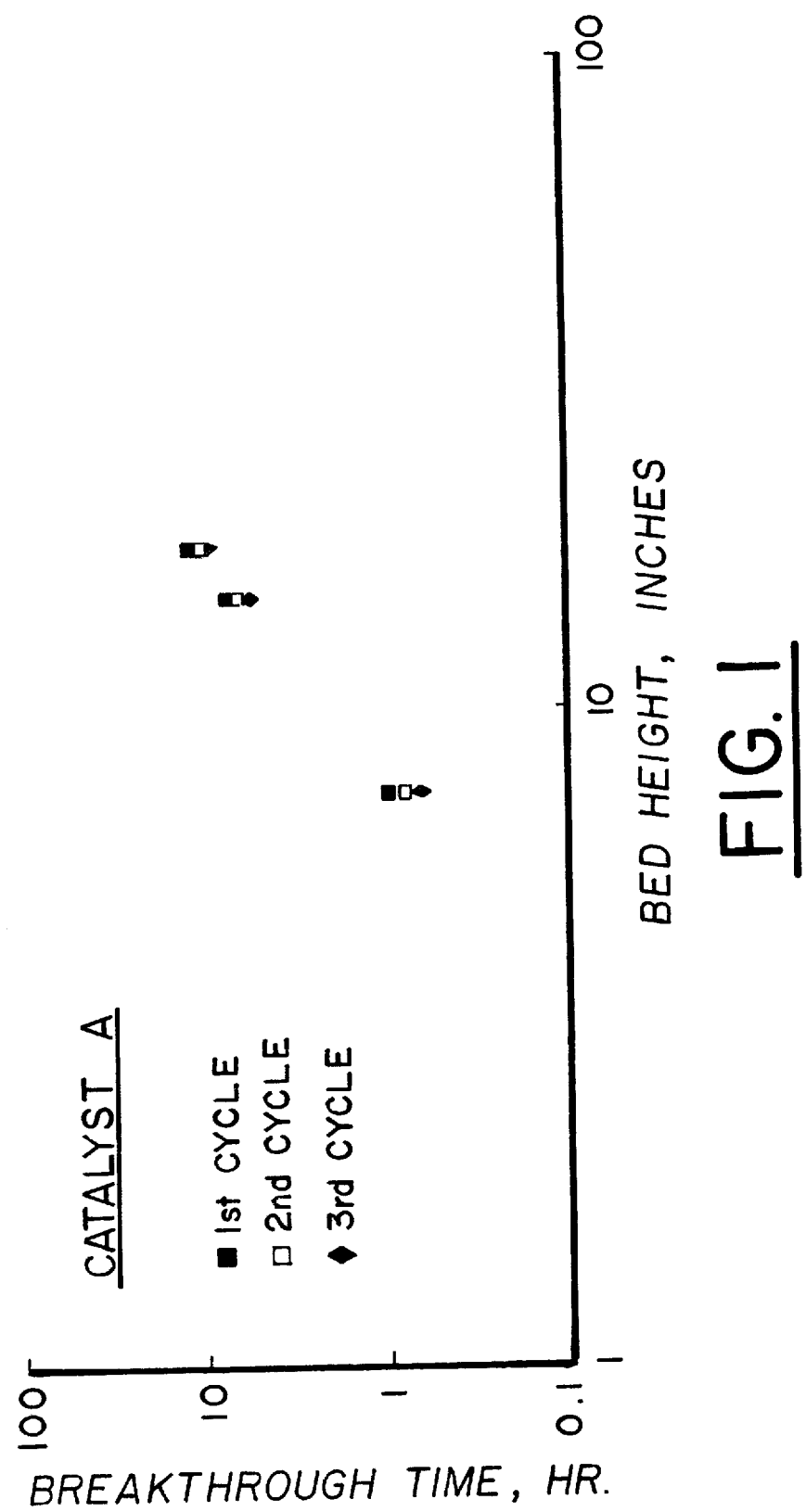
FIG. 1 is a plot of breakthrough time in hours against bed height when using the process of the invention to regenerate a commercial nickel-based catalyst.

In the production of UHP nitrogen, it is conventional to start with cryogenically produced nitrogen which normally contains parts-per-million levels of oxygen, carbon monoxide, hydrogen, carbon dioxide and water (hereinafter referred to as the unwanted species) in the nitrogen. The unwanted species can be effectively removed or reduced to below parts-per-billion levels by passing the cryogenically produced nitrogen through a bed of a nickel-based catalytic adsorbent. Among the unwanted species set forth above, the nickel-based catalytic adsorbent has the least capacity for carbon dioxide and the highest capacity for oxygen. During a normal purification cycle, the carbon dioxide is usually the first species to break out of a nickel-based purifier bed. According to current practice, as soon as the carbon dioxide breakthrough occurs, the adsorbent bed is taken off-stream and is regenerated using a reduction gas, such as a dilute (1 to 2%) hydrogen in nitrogen mixture. The use of the hydrogen/nitrogen mixture requires a nitrogen purge after the unwanted species are desorbed or removed from the nickel-based catalytic adsorbent. Purging results in a long time interval before the catalytic bed can be put back in service because of the residual hydrogen from the regeneration step. The long purge also increases the cost for producing UHP nitrogen by this method.

It has been discovered that with the conventional nickel-based catalyst adsorbent systems, depending upon the geometry of adsorbent bed, one or more interim regenerations using UHP nitrogen can be employed before it is necessary to use a hydrogen/nitrogen mixture reduction regeneration.

According to the present invention, once the detection of carbon dioxide breakthrough occurs, the catalyst bed is taken out of service and subjected to a step wherein it is heated to a temperature of at least 300° F. (149° C.) and preferably within a range of 300° F. (149° C.) to 572° F. (300° C.). This is followed by flowing UHP nitrogen, without addition of hydrogen, through the catalytic adsorbent bed while maintaining a temperature in the bed of at least 300° F. (149° C.) and preferably within the range of 300° F. (149° C.) to 572° F. (300° C.) for a period of time to desorb or remove the unwanted species from the catalytic adsorbent bed. Thereafter, the bed is cooled to a temperature of no greater than 120° F. (49° C.) and at that time is ready to be placed in service. Normally, two or more beds would be available to permit the continuous purification of the cryogenically produced nitrogen by having one bed on-stream effecting removal of unwanted species from the cryogenically produced nitrogen while the other bed or beds are being regenerated, or have been regenerated and are idled waiting for reengagement in the process.

The following examples illustrate the present invention.

EXAMPLE 1

After a conventional regeneration with hydrogen, a purifier packed with 3.66 lbs of a commercial Nickel-Alumina ($Ni/Al_2O_3$) catalyst, Catalyst A, was challenged with 2.4 ppm CO and 3.6 ppm $O_2$ in a nitrogen gas flow of 3.5 scfm. The purifier was operated at 80° F. and 80 psig inlet pressure. The packed bed height was 48 inches. Since $CO_2$, a product from the chemical reaction between CO and $O_2$, is the first impurity to break out of the catalytic adsorber, the purifier has to be regenerated once $CO_2$ breaks through the packed bed. A 24-hour regeneration procedure without hydrogen according to the following scheme was tested:

|   |   | Time Duration, hrs. |
|---|---|---|
| 1. | Heat up to 204.4° C. (400° F.) | 1 |
| 2. | Hot Purge with UHP Nitrogen (no $H_2$) at 204.4° C. (400° F.) | 16 |
| 3. | Cooling under UHP Nitrogen to 21° C. (80° F.) | 7 |
|   | Total hours = | 24 |

The regeneration flow was 0.28 scfm nitrogen. Three successive cycles were performed. The results are summarized in FIG. 1 where the $CO_2$ breakthrough time (defined at 10 ppb $CO_2$ in the stream) is plotted against bed height. As shown in FIG. 1, at 18" of bed height, the breakthrough time reduced slightly from 12 hours to 10.3 hours and then to 9.2 hours with successive regenerations. In all cases, no $CO_2$ breakthrough at the exit (45") of the bed was observed for the 24-hour cycle operation. The original capacity can be recovered with a conventional regeneration with hydrogen.

EXAMPLE 2

A similar experiment was conducted with a commercial Nickel-Kieselguhr catalyst, Catalyst B. A reactor of the same dimension as in Example 1, was loaded with 6.84 lbs. of Catalyst B and activated with a conventional reduction procedure. As with Example 1 the purifier was operated at 80° F. and 80 psig inlet pressure, challenged with 2.4 ppm Co. And 3.6 ppm $O_2$ in a nitrogen gas flow of 3.5 scfm. Four consecutive breakthrough runs were made with three interim regenerations without using hydrogen. The interim regeneration procedure was the same as described in Example 1.

The results are depicted in FIG. 2. Again, the $CO_2$ capacity, which is indicated by the breakthrough time, decreases slightly with successive regenerations without hydrogen. However, the purifier effectively removes the impurities as no $CO_2$ breakthrough is observed at the exit of the purifier.

Normally, a conventional regeneration procedure requires four steps. For a 72-hour operating cycle, the following regeneration is typical:

|   |   | Time Duration, hrs. |
|---|---|---|
| 1. | Heat up to 204.4° C. (400° F.) | 4 |
| 2. | Reduction (with an $H_2$ containing gas) at temperature (204.4° C.) | 8 |
| 3. | Hot Purge with UHP Nitrogen at temperature (204.4° C.) | 48 |
| 4. | Cooling under UHP Nitrogen to 21° C. (80° F.) | 12 |
|   | Total hours = | 72 |

During the entire regeneration process, a flow of high purity nitrogen at a rate of 4 to 8% of treated gas flowrate is normally required.

This invention makes it possible to use several interim regenerations before a conventional regeneration is needed. The interim regenerations, while replacing conventional regenerations, maintain the same cycle time, and require no hydrogen. Operational savings can be realized by alleviating the reduction step and shortening the purge step. Applying the regeneration method of the present invention results in the elimination of the reduction step. In addition, the duration of the hot purge step can be significantly reduced.

An interim regeneration procedure for a typical 72-hour cycle can be as follows:

|   |   | Time Duration, hrs |
|---|---|---|
| 1. | Heat up to 204.4° C. (400° F.) | 4 |
| 2. | Hot Purge with UHP Nitrogen (no $H_2$) at temperature (204.4° C.) | 24 |
| 3. | Cooling under UHP Nitrogen to 21° C. (80° F.) | 12 |
| 4. | Idle | 32 |
|   | Total hours = | 72 |

The idle step is needed to maintain the 72-hour cycle. With the interim regeneration, no hydrogen is required and the nitrogen consumption is greatly reduced.

Using the process of the present invention wherein one or more interim regeneration is effected without the use of hydrogen can result in significant savings to the operator of a facility producing UHP nitrogen from cryogenically produced nitrogen. For example, assuming a conventional regeneration is required after five interim regenerations, 37% nitrogen and 83% of the hydrogen used in the conventional regeneration scheme can be saved. Thus for a typical 50,000 SCFH nitrogen purification process which uses 8% of the flow during regeneration, the savings in gas consumption are:

UHP $N_2$ saved every 6 cycles (432 hours)=8,000,000 scf
UHP $H_2$ saved every 6 cycles (432 hours)=20,000 scf.

Therefore, this translates to a yearly saving of 160 MMSCF nitrogen and 400 MSCF hydrogen.

The present invention has been discussed and illustrated in relation to the production of ultra-pure nitrogen. However, any gas purification process that uses similar catalytic adsorbent techniques, can use the process of the present invention with similar results. For example, similar purifiers are used in the production of ultra-high purity argon and helium so the process is applicable to these gases also.

Having thus described our invention, what is desired to be secured by Letters Patent of the United States is set forth in the appended claims.

What is claimed:

1. In a process for regenerating a nickel-based catalytic adsorbent bed used to remove parts-per-million quantities of unwanted species compulsing carbon monoxide, oxygen, hydrogen, carbon dioxide and/or water from a cryogenically produced nitrogen gas stream by regeneration using hydrogen reduction; the improvement comprising, after a regeneration using hydrogen and subsequently passing said cryogenically produced nitrogen gas stream through said nickel-based catalytic adsorbent bed to remove said unwanted species, regenerating said bed at least once prior to further passing said cryogenically produced nitrogen gas stream through said nickel-based catalytic adsorbent bed to remove said unwanted species and prior to a subsequent hydrogen regeneration by:

(a) heating said adsorbent bed to a temperature of at least about 300° F. (149° C.);

(b) flowing nitrogen having a purity of at least 99.9999% $N_2$ through said bed while maintaining said bed at a temperature of at least about 300° F. (149° C.) for a period of time to remove a major portion of the adsorbed species from said adsorbent bed;

(c) cooling said adsorbent bed to a temperature of no higher than 120° F. (49° C.) wherein steps a), b) and c) are performed without the addition of hydrogen.

2. A process according to claim 1 wherein said adsorbent bed is heated to a temperature of from 300° F. (149° C.) to 572° F. (300° C.).

3. A process according to claim 1 wherein said nitrogen is flowed through said bed at a rate of at least 4% of the rate of flow of the nitrogen gas stream being subject to removal of unwanted species.

4. A process according to claim 1 wherein said bed is maintained at a temperature of from 300° F. (149° C.) to 572° F. (300° C.) during said time said nitrogen is flowing through said bed.

5. A process according to claim 1 including the step of holding said adsorbent bed in an atmosphere of ultra-high purity nitrogen after said cooling step.

6. A process for minimizing the number of cycles using hydrogen to regenerate a nickel-based catalytic adsorbent used to remove unwanted species from a cryogenically produced nitrogen gas stream by using at least one interim regeneration comprising the steps of heating said adsorbent to a temperature of at least about 300° F. (149° C.);

flowing nitrogen having a purity of at least 99.9999% $N_2$ through said adsorbent while maintaining said adsorbent at a temperature of at least about 300° F. (149° C.) for a period of time to remove a major portion of the adsorbed species from said adsorbent; and cooling said adsorbent to a temperature of no higher than 120° F. (49° C.) wherein said steps are performed without the addition of hydrogen.

7. A process according to claim 1 wherein said adsorbent is heated to a temperature of from 300° F. (149° C.) to 572° F. (300° C.).

8. A process according to claim 1 wherein said nitrogen is flowed through said adsorbent at a rate of at least 4% of the rate of flow of the nitrogen gas stream being subject to removal of unwanted species.

9. A process according to claim 8 wherein said adsorbent is maintained at a temperature of from 300° F. (149° C.) to 572° F. (300° C.) during said time said nitrogen is flowing through said bed.

10. A process according to claim 6 including the step of holding said adsorbent in an atmosphere of ultra-high purity nitrogen after said cooling step.

* * * * *